United States Patent [19]

McLaughlin

[11] Patent Number: 4,615,502

[45] Date of Patent: Oct. 7, 1986

[54] CARRIER FOR COMPUTER DISPLAYS

[76] Inventor: Thomas F. McLaughlin, 49 Stonowaye, Chappaqua, N.Y. 10514

[21] Appl. No.: 663,035

[22] Filed: Oct. 19, 1984

[51] Int. Cl.$^4$ ............................................. F16M 11/00
[52] U.S. Cl. .................................... 248/176; 248/178; 248/371
[58] Field of Search ............... 248/176, 180, 149, 371, 248/346, 676, 618, 129

[56] References Cited

U.S. PATENT DOCUMENTS

| | | | |
|---|---|---|---|
| 1,918,604 | 7/1933 | Johnson | 248/129 |
| 2,311,928 | 2/1943 | Buehler | 248/129 X |
| 4,044,980 | 8/1977 | Cummins | 248/676 |
| 4,354,654 | 10/1982 | Werner et al. | 248/371 |
| 4,478,382 | 10/1984 | Carrier | 248/176 |
| 4,494,720 | 1/1985 | Gregory et al. | 248/371 |

Primary Examiner—Ramon O. Ramirez
Attorney, Agent, or Firm—Peter L. Berger

[57] ABSTRACT

A movable carrier for a computer display permits the display to be radially moved while simultaneously preventing forward or backward movement. Additionally, the carrier can be lifted to permit forward and backward movement and further includes means to raise the display to selected heights and angles for easy viewing.

12 Claims, 3 Drawing Figures

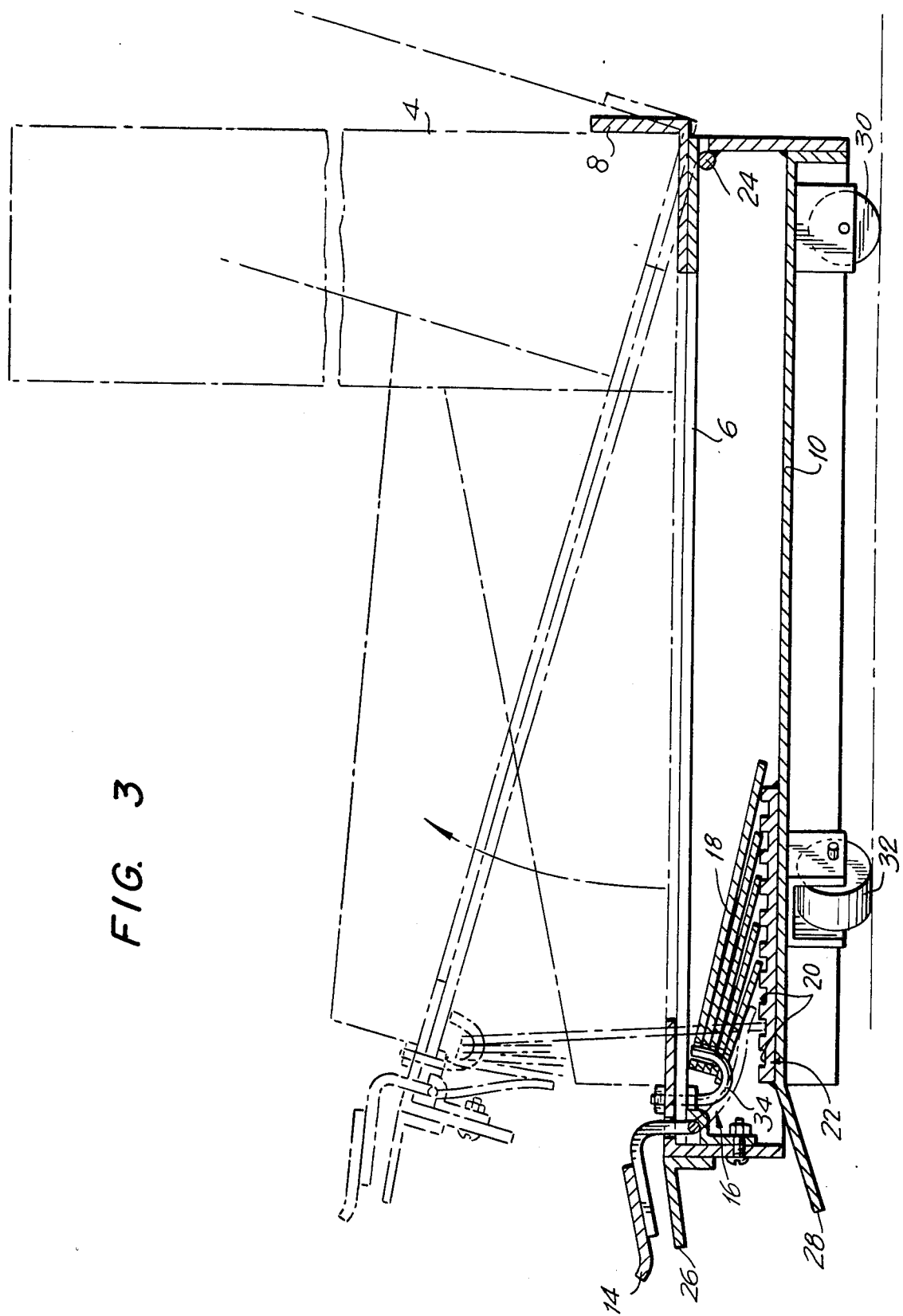

CARRIER FOR COMPUTER DISPLAYS

BACKGROUND OF THE INVENTION

The present invention relates to the art of carrier devices for the support of equipment, such as computer displays which require movement during day-to-day use.

Previously devices for the movement of computer displays with the intent of easy access have included complex universal arm devices which while increasing the amount of surface area of the work table available for use for other purposes are complex, difficult to use, not easily portable and can be subject to movement while the computer display resting thereon is in use. Other carriers require either permanent affixation to the table and therefore are not easily moved or their movement is limited to radial and/or pivotal upward movement, however, with the added disadvantage of tending to be subject to displacement during use of the computer display resting thereon.

A common prior art mechanism for assisting the user in viewing the display comprises a tilt and rotate mechanism which is connected directly to the display housing or is connected between the display and a fixed surface. This fixed position of the tilt and rotate mechanism prevents its movement on the table or desk. Additionally, the amount of tilt is limited.

An object of the present invention is to provide a movable carrier for the support of a computer display which permits the carrier and computer display to move on a flat surface, while permitting the desired tilt and rotate motions.

Another object of the invention is to provide for such a movable carrier which will not easily slip or displace while resting on a flat surface during use of the computer display.

Still another object of the invention is to provide for a movable carrier which allows for use of the computer display from an adjustable desired angle.

A further object of the invention is to provide for a carrier which can be easily moved radially in relation to a flat surface.

Another object is to provide an improved mechanism for moving and holding the computer display in a tilted position permitting easy viewing of the computer display.

Other objects, advantages and features of the present invention will become obvious to those skilled in the art from the following detailed description.

SUMMARY OF THE INVENTION

The above objects are met by the present invention which provides for a movable carrier device for moving a computer display across a flat surface such as a desk. The carrier provides for forward, rearward, and radial movement of the platform in relation to the desk through a unique arrangement of roller wheels. The carrier after its positioning in the desired location on the flat surface cannot be easily moved forward or rearward, while the computer display is in use through this unique arrangement of the roller wheels.

The carrier also has an upper frame upon which the computer display rests, the upper frame being pivotally connected to a lower base member and can be pivoted upwardly for convenient viewing and use of the computer display at an adjustable angle with respect to the table. The means for moving and support of the computer display comprises a progression of increasingly sized cantilevered plates which swing down from a cantilever support to be engaged in slots in a slotted resting member.

BRIEF DESCRIPTION OF THE DRAWINGS

FIG. 3 is a cross-sectional view taken along line 3—3 of FIG. 1 with a computer display in phantom and the upper carrier member and cantilevered plates shown in phantom when pivoted to a desired angle.

DETAILED DESCRIPTION

Figure 1:
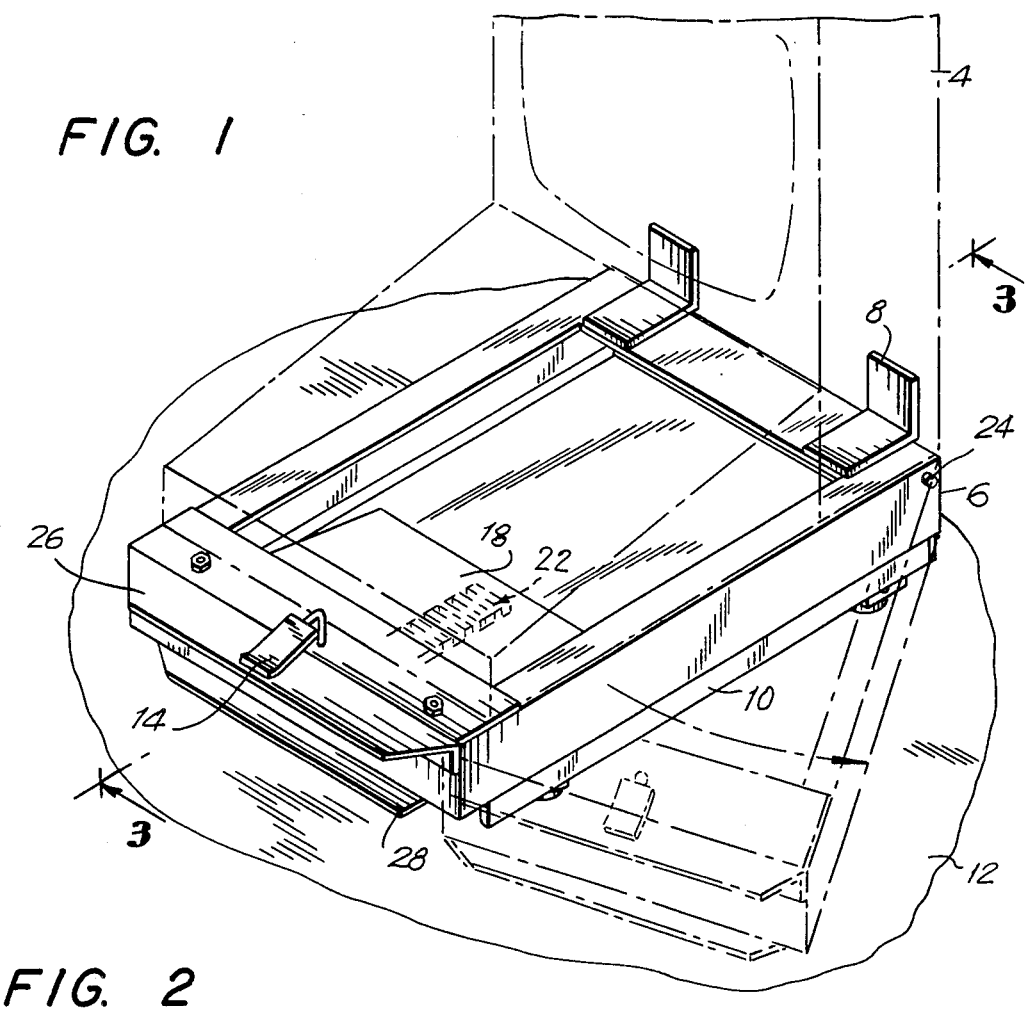
FIG. 1 is a perspective view of one embodiment of the invention showing radial movement of the carrier with a computer display in phantom.
Figure 2:
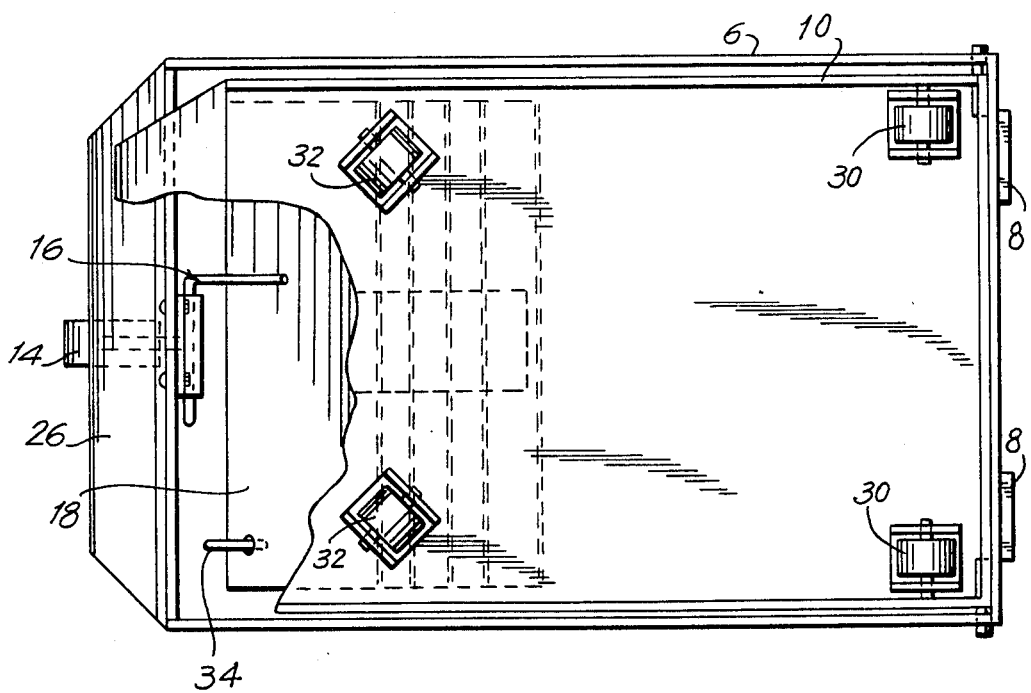
FIG. 2 is a bottom view of the carrier shown in FIG. 1 with a partial cutaway.

Referring to FIGS. 1, 2 and 3, FIG. 1 shows one embodiment of the invention wherein a computer display 4 is resting on an upper carrying frame 6 against two back stops 8 incorporated within the upper carrying frame 6. The phantom drawing illustrates a keyboard and display although preferably only a display will be carried on the carrying frame 6. A lower base member 10 is supporting the upper carrying frame 6 and computer display 4 as the entire carrier rests on a flat surface 12. Radial movement in a plane in relation to the flat surface 12 is effectuated by moving the front of the device with respect to a rear pivot point defined by the intersection of the axis of a pair of forward angularly disposed spaced-apart wheels 32 (FIG. 3).

FIG. 2 is a bottom view of the carrier shown in FIG. 1 as if looking upward through a transparent flat surface 12 (FIG. 1). Incorporated within the lower base member 10 are two parallel spaced-apart movable wheels 30 rearwardly disposed in the corners of the lower base member 10 to permit the forward and rearward movement of the carrier. These wheels 30 have a common axle line 31. Also incorporated in the lower base member 10 are the two forwardly disposed spaced-apart movable wheels 32 which are articulated angularly from the front of the carrier to permit radial movement of the carrier across the flat surface 12. The angles of the axes of the forward wheels are equal. The forwardly disposed wheels 32 have their axes 33 oriented to intersect each other at the center of the center axle line 31 between the rear wheels 30. While the computer display 4 is in use, these forwardly disposed movable wheels 32 act as a brake against forward and rearward movement of the carrier.

The carrier is moved forward and rearward by lifting the carrier with a lower lift protruding surface 28 incorporated within the lower base member 10. This lifts the forward wheels 32 from the flat surface 12 thereby cancelling their braking function and allows easy movement of the carrier forward and rearward through movement of the rear wheels 30.

In FIG. 3, the upper carrying frame 6 includes an upper lift protruding surface 26 which raises the upper carrying frame 6 which is pivotally connected at its rear to the lower base member 10 by pivots 24. As this is happening a series of stepped cantilevered plates 18 suspended on a cantilever suspension means 34 begins to drop relative to the height to which the front of the upper carrying frame is lifted. When the upper carrying frame 6 reaches a desired angle or height, the dropped cantilevered plates 18 engage in notches 20 formed in a slotted resting member 22 which is attached to the lower base member 10. The notches 20 are formed by a plurality of parallel slots, but the holding effect on the cantilevered plates could be achieved with a roughened surface. As a result, the upper carrying frame 6 with the computer display 4 is "locked" into place at the desired height or angle. The angle of the upper carrying frame 6 may be changed by lifting the upper carrying frame 6 and raising the upper lift protruding surface 26 to free the cantilevered plates 18 from the slotted member 22. The larger cantilevered plates 18 may now be freed to be positioned in the notches 20 and hold the upper carrying frame at a larger viewing angle. If downward movement is desired, the upper carrying frame 6 is lifted slightly with the upper lift protruding surface 26 to release the engaged cantilever plate which is then swung free with the shorter cantilevered plates. This is accomplished by pressing on a release latch 14 which moves a release lever 16 rearward and upward against the disengaged cantilevered plates 18. The upper carrying frame 6 is then lowered to a new desired viewing angle and the latch 14 is released disengaging the lever 16 allowing the cantilevered plates 18 to drop into place in the slotted resting member 22 locking the upper carrying frame 6 at the new desired angle.

It should be noted that the viewing angle is determined primarily by only the one cantilevered plate which engages the slotted resting member 22. The cantilevered plates which are shorter do not fully reach the notches 20, while those longer remain substantially horizontal and free. It should also be noted that due to the weight of the computer display 4 some of the shorter cantilevered plates 18 may actually engage the slots.

Accordingly, the carrier of the present invention allows for the computer display to be easily moved to a variety of positions on a flat surface to facilitate multi-viewer access and allows for the angle of the computer display to be adjusted to a variety of viewing heights while preventing unwanted forward and rearward movement.

An alternate embodiment provides for the tilt mechanism comprising the upper carrying frame 6, the cantilevered plates 18 and the lower base member 10 without the wheels. This embodiment is directed to those computer displays which are intended to be placed on top of another computer component, such as the IBM PC. The alternate embodiment has a swivel plate connection to the other computer component housing permitting rotation of the display as well as the above described tilt mechanism of this invention.

The carrier described in the present invention may be constructed from any suitable material and although this invention has been described with one preferred embodiment, other modifications will be apparent to those of ordinary skill in the art.

What is claimed is:

1. Apparatus for raising and supporting a computer display to selected heights and angles, said apparatus comprising an upper carrying frame pivotally attached at its rear portion to a rear portion of a lower base member, said upper carring frame comprising a cantilever carrying surface carrying a plurality of progressively sized cantilevered plates hingedly suspended from said cantilever carrying surface, said lower base member comprising a cantilever plate engaging member for engaging selected ones of said cantilevered plates according to the height to which said upper carrying frame is raised to support said upper carrying frame at a selected height and angle whereby when said upper carrying member is lifted, said cantilevered plates through gravity swing downwardly and selected ones thereof engage said cantilever plate engaging member to support said upper carrying frame at a desired angle with respect to said lower base member, and release means incorporated within said upper carrying frame to release the cantilevered plates to change the viewing height and angle of the display.

2. An apparatus as set forth in claim 1, wherein said cantilever plate engaging member comprises a plurality of parallel slots in which said cantilevered plates are engaged.

3. An apparatus as set forth in claim 1, further comprising a finger release lever operative to hold said cantilevered plates free from engagement with said cantilever plate engaging member to permit the height and angle of said upper carrying frame to be changed.

4. A device as set forth in claim 3, wherein said finger release lever is operated by the same hand which changes the position of the display.

5. A device as set forth in claim 1, further comprising:
movement means incorporated within said lower base member permitting forward and rearward movement of said upper carrying frame across said flat surface;
radial movement means incorporated within said lower base member permitting radial movement of said upper carrying frame while simultaneously preventing forward and rearward movement of said carrier;
said radial movement means being disengaged permitting said movement means to allow said carrier to move forwardly and rearwardly.

6. A carrier as set forth in claim 5, wherein the movement means for forward and rearward movement comprises at least one rearwardly disposed wheel incorporated within said lower base member.

7. A carrier as set forth in claim 5, wherein said radial movement means comprises at least one angularly oriented forwardly disposed wheel incorporated within said lower base member.

8. A carrier as set forth in claim 5, wherein said movement means comprises a pair of spaced-apart rearwardly disposed wheels incorporated within said lower base member, the axes of said wheels aligned along a center axle line between said wheels.

9. A carrier as set forth in claim 8, wherein said radial movement means comprises a pair of spaced apart angularly disposed wheels having their axes intersect each other at the center of the center axle line.

10. A carrier as set forth in claim 5, wherein said upper carrying frame comprises a back rest, said movement means comprises a pair of spaced-apart rearwardly disposed wheels attached to said lower base member, said radial movement means comprises a pair of spaced-apart forwardly located wheels attached to said lower base member and angularly disposed with respect to each other and said rearward wheels, whereby when said carrier is resting on said flat surface, said forwardly located wheels preventing forward or rearward movement while permitting radial movement, the front of said base member being lifted to lift the forward wheels off the flat surface to permit forward and rearward movement of said carrier.

11. Apparatus as set forth in claim 1 wherein said cantilever plate engaging member comprises friction means to hold said cantilevered plates.

12. Apparatus as set forth in claim 11 wherein said friction means comprises a slide resistant surface to statically hold said cantilevered plates on said cantilever plate engaging member.

* * * * *